UNITED STATES PATENT OFFICE.

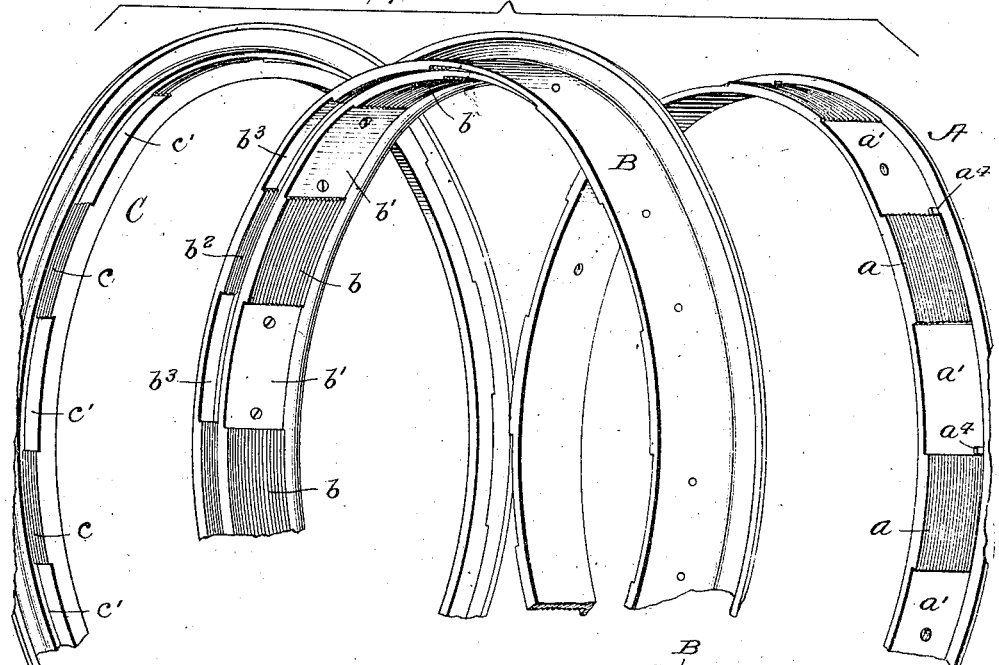

AUGUSTUS D. FOUCART, OF MUNCY, PENNSYLVANIA.

DETACHABLE WHEEL-RIM.

989,494.  Specification of Letters Patent.  Patented Apr. 11, 1911.

Application filed December 15, 1908. Serial No. 467,629.

*To all whom it may concern:*

Be it known that I, AUGUSTUS D. FOUCART, a citizen of the United States, and a resident of Muncy, in the county of Lycoming, in the State of Pennsylvania, have invented certain new and useful Improvements in Detachable Wheel-Rims, of which the following is a specification.

My invention is an improvement in detachable wheel-rims particularly those which are provided with pneumatic or solid-rubber tires such as are commonly used on automobiles, traction engines, and bicycles.

My invention is embodied in the construction, arrangement, and combination of parts hereinafter described, whereby I am enabled to detach the rubber tire or outer portion together with the part to which it is attached, and to substitute a similar one in a few seconds.

The details of construction and arrangement are as hereinafter described, and illustrated in the accompanying drawings in which—

Figure 1 is a perspective view of the different parts of my improved wheel-rim, disassociated; Fig. 2 is a section of the portion of the wheel-rim showing the parts composing it shoved together, or in the position which they occupy before being rotated on each other to engage their screw-threaded sections; Fig. 3 is a similar section of the same parts showing the screw sections engaged; and Fig. 4 is a cross section of a wheel-rim together with an inflatable elastic tire secured thereto. Fig. 5 is a perspective view of a modified part.

A indicates the fixed or permanent rim of the wheel, and F a detachable rim, composed of the parts B and C, the rim F being adapted to surround the part A, with which it may be locked, as will be presently described. The flange C is adapted to be screwed on to the part B and both of these parts B and C have inwardly curved flanges which are adapted to engage the shoulders of the elastic tire D. In practice, the fixed rim A may, therefore, be taken as a felly or rim of a wheel, for in any case it is the foundation or fixed part to which the detachable rim F, or B′ (shown in Fig. 5) is to be applied. As shown in Fig. 1, the fixed rim A is provided on its outer side with a series of threaded sections $a$ and intervening threadless, or blank, sections $a'$. In other words, a rim A is provided with a sectional or interrupted screw-thread. The detachable rim F is similarly provided, interiorly, with a corresponding sectional or interrupted screw-thread $b$. The threadless or blank sections $b'$, which intervene, are necessarily sunk below the threads $b$. When the rim F is put together, the threaded sections $a$ and $b$ engage or interlock as shown in Figs. 3 and 4, and the two adjacent blank sections $a'$ and $b'$ are then opposite each other as shown in Fig. 3.

The detachable flange C is provided with an interrupted screw-thread $c$, the threadless or blank spaces $c'$ alternating with the threaded sections $c$. Thus the flange C is adapted for engagement with the part B which is correspondingly provided with threaded narrow sections $b^2$ and intervening blank sections $b^3$.

It will now be understood that, supposing it is desired to attach the rim F to the fixed rim A, the rim F is held opposite the rim A and in such relation thereto that its threaded sections $b$ are directly opposite the threadless or blank sections $a'$ of rim A, and then pushed laterally onto the fixed rim A. In such case it is obvious that the threaded sections of one rim will lie between the threaded sections of the other one, as shown in Fig. 2. This is the first step in applying the detachable flanged rim which holds the rubber tire D. The next step consists simply in rotating the rim F on the fixed rim A, as indicated by arrow in Fig. 2, and this movement is continued until the threaded portions $a$ and $b$ engage as shown in Fig. 3, the blank sections $a'$ and $b'$ then being directly opposite each other, whereby a space is left between the rims A and F as shown. The detachable flange C may be attached to the part B before the latter is screwed on as just described.

From the foregoing description, it will be seen that but two movements are required to engage the detachable wheel rim F with the fixed rim A. It is to be understood that a cushion or inflated tire D may have been previously applied to the outer rim and secured by flanges of parts B and C, as shown in Fig. 4. The entire operation of attaching the detachable outer flanged rim F, (with the elastic tire D attached), to the fixed rim A may be effected in a few seconds.

In order to detach from the fixed rim A, the flanged wheel rim F, with the elastic tire D secured thereto, it is simply necessary to reverse the operation above described; that is to say, the rim F is rotated to the left far enough to bring the threaded sections out of engagement, and then the wheel rim F, with tire D attached, is drawn laterally away from the fixed rim A.

In order that the detachable rim formed of parts B and C may be applied with still greater celerity, the fixed rim A may be provided with one or more stops $a^4$ (see Fig. 1), which come in contact with the threaded sections $b$ of the rim F when the latter is turned to bring opposite threaded sections into engagement.

As has been above intimated, a space is left between the rims A, and F, where the two blank sections are opposite each other when the threaded sections are engaged as shown in Fig. 3. This space is covered by a peripheral flange of rim A on one side of the wheel, and on the other side by the dependent flange of the detachable rim F, as shown in Fig. 4.

As before intimated, the parts B, C, may be substituted by the rim B' shown in Fig. 5, the same having no upwardly curved flanges and being adapted to any make or form of tire rim. It is provided on the inner side with a flange extending inward for covering the spaces between the threaded portions of rims A, and F, when these are screwed together.

In order to prevent any possible movement of the rims F, or B' on the fixed rim A when duly locked together by engagement of the screw-threaded sections, a screw stop E (Fig. 4) may be employed, the same screwing out through the fixed rim A and entering the rim F. This and certain other details are further illustrated in my Patent No. 906,404 granted Dec. 8, 1908.

It is to be understood that the construction of the outer detachable part or rim in two annular portions is merely illustrative, and the scope of the invention is not necessarily restricted thereto.

What I claim is:

1. In a wheel, the combination of a fixed rim having exterior interrupted threaded sections, and an exterior rim having a detachable flange adapted for holding an elastic tire and having interiorly threaded sections of less length than the spaces between the threaded sections of the fixed rim, whereby such exterior rim, with elastic tire attached, may be applied and secured to, or detached from, the fixed rim, as shown and described.

2. A vehicle wheel having a felly provided at the outer periphery with interrupted threads, and a removable rim provided at the inner periphery with corresponding, interrupted threads, said felly and said rim at opposite edges having flanges.

AUGUSTUS D. FOUCART.

Witnesses:
A. W. TALLMAN,
H. G. GUELKER.